JOHN W. THIEME
PATRICK J. McDONNELL
INVENTORS.

Huebner, Beehler, Worrel & Herzig
BY

ATTORNEYS.

Nov. 7, 1961    J. W. THIEME ET AL    3,007,378
ROTATABLE AND TILTABLE DEVICE AND CLUTCH MEANS THEREFOR
Filed Jan. 19, 1956    2 Sheets-Sheet 2
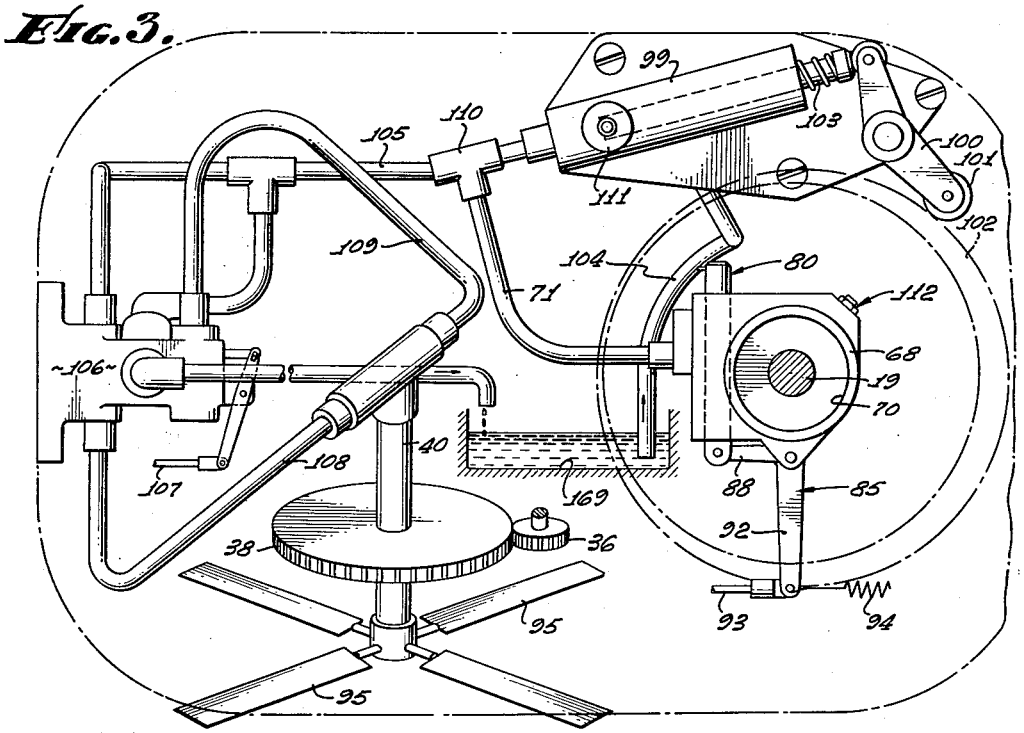
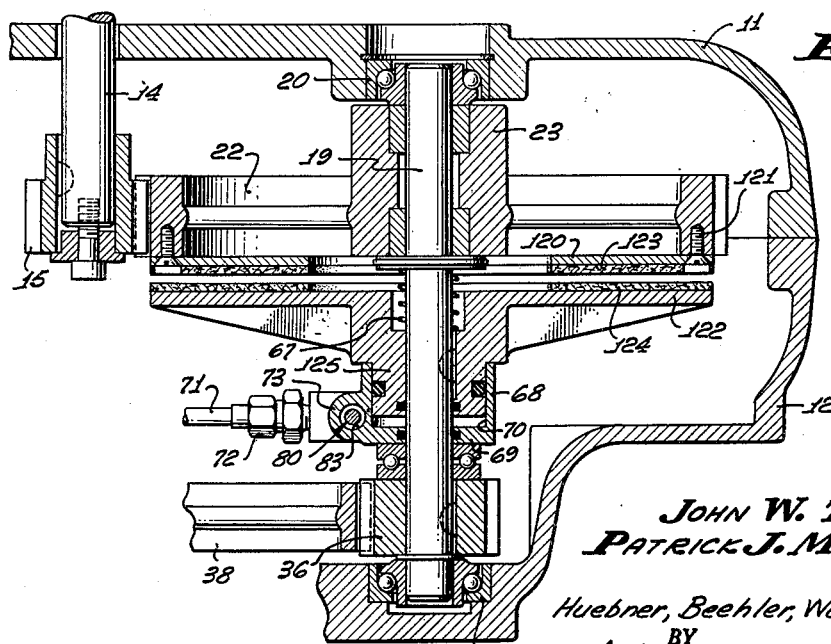
JOHN W. THIEME
PATRICK J. MCDONNELL
INVENTOR.
Huebner, Beehler, Worrel & Herzig
BY
ATTORNEYS.

3,007,378
ROTATABLE AND TILTABLE DEVICE AND CLUTCH MEANS THEREFOR
John W. Thieme, 735 E. Compton Blvd., Rte. 1, West Compton, Calif., and Patrick J. McDonnell, Compton, Calif.; said McDonnell assignor to said Thieme
Filed Jan. 19, 1956, Ser. No. 560,187
7 Claims. (Cl. 94—45)

The invention relates to clutches for power plants and is one particularly well adapted to employment on combustion engines of relatively low horse-power output. Within recent years there has been exeperienced a tremendous increase in use of relatively low horse-power output combustion engines. A great many engines of two to five horse-power have found employment on small, hand-manipulated, power machinery such as lawn mowers, cultivators, graders, and the like. Similar low-powered combustion engines have more recently come into vogue for use on concrete finishing machines. Machines of this type have some particular aspects peculiar to their use in that ordinarily they are not supported by wheels or skids but rather have the entire weight of the machine supported by the work elements in the form of trowels. Current practice is to employ a set of rotating trowels for performing the work which are adjustable within a limited degree depending upon the type of work being performed on newly poured concrete or perhaps the type of finish desired.

Clutches heretofore employed on concrete finishing machines have been clutches, the engagement of which depends upon the speed of rotation of the prime mover. That is to say, when the combustion engine is throttled down to idling speed, the clutch disengages automatically. On the contrary, when the prime mover is speeded up to operating speed, at some particular point the clutch engages and remains engaged at all times and cannot be disengaged so long as the prime mover is rotating at something other than idling speed.

This condition has many harmful effects, chief among which is the fact that should the operator lose hold of the handles on which the throttle is mounted, the prime mover will continue to operate at operating speed but the working elements, namely, the trowels, will tend to become embedded in the soft concrete and stay in fixed position while the handle rotates dangerously.

On other occasions when the machine is used for working around corners of forms, it frequently becomes desirable to disengage the operation of the trowels without slowing down the engine speed. In devices heretofore employed this has not been possible. Smooth and effective performance is better accomplished by having the prime mover continue to operate at full speed or in any event an effective operating speed even while not working. To achieve such a condition some form of clutch has been needed which can be disengaged and re-engaged without having to change the engine speed and under circumstances wherein the engagement or disengagement will not be too abrupt.

It is therefore among the objects of the invention to provide a new and improved clutch device for low horse-power output combustion engines which can be positively engaged and disengaged at any time regardless of engine speed.

Another object of the invention is to provide a new and improved clutch device which will take hold and release quickly regardless of engine speed and which can be engaged and disengaged by relatively light hand or finger pressure on an appropriate clutch control mechanism.

Another object still is to provide a new and improved power operated clutch device by means of which the operator can apply hydraulic pressure generated by a pump mechanically connected to the drive shaft for the purpose of moving a clutch into and out of engagement.

Also included among the objects of the invention is to provide a new and improved cement finishing machine adapted to use lubricating oil in a hermetically sealed system for hydraulic purposes wherein a high pressure pump is used at one and the same time for supplying high pressure hydraulic power to manipulate the tilt of the blades and low pressure power for controlling the clutch without the necessity of introducing any pressure regulating means into the hydraulic system.

Still another object of the invention is to provide a new and improved simplified cone clutch mechanism especially well adapted to engines of relatively moderate power output wherein the parts are relatively few and simple in construction and moreover arranged in a relationship whereby both the cost of fabrication of parts and the cost of assembly is low enough to permit wide-spread use of a positive-acting clutch in combination with such an engine.

Still further among the objects of the invention is to provide a new and improved cone type clutch which is simple and positive in its construction and action, which is adaptable to a drive train which is either axially continuous or wherein axially mounted parts are offset one with respect to the other and which furthermore is adapted to a simplified endwise acting actuator mechanism of a variety of available types.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

FIGURE 3 is a schematic view illustrating the arrangement of the hydraulic system for manipulation of both the blade tilting and clutch actuation.

FIGURE 4 is a longitudinal sectional view somewhat similar to FIGURE 1 but illustrating a disc clutch rather than a cone type clutch.

Figure 1:
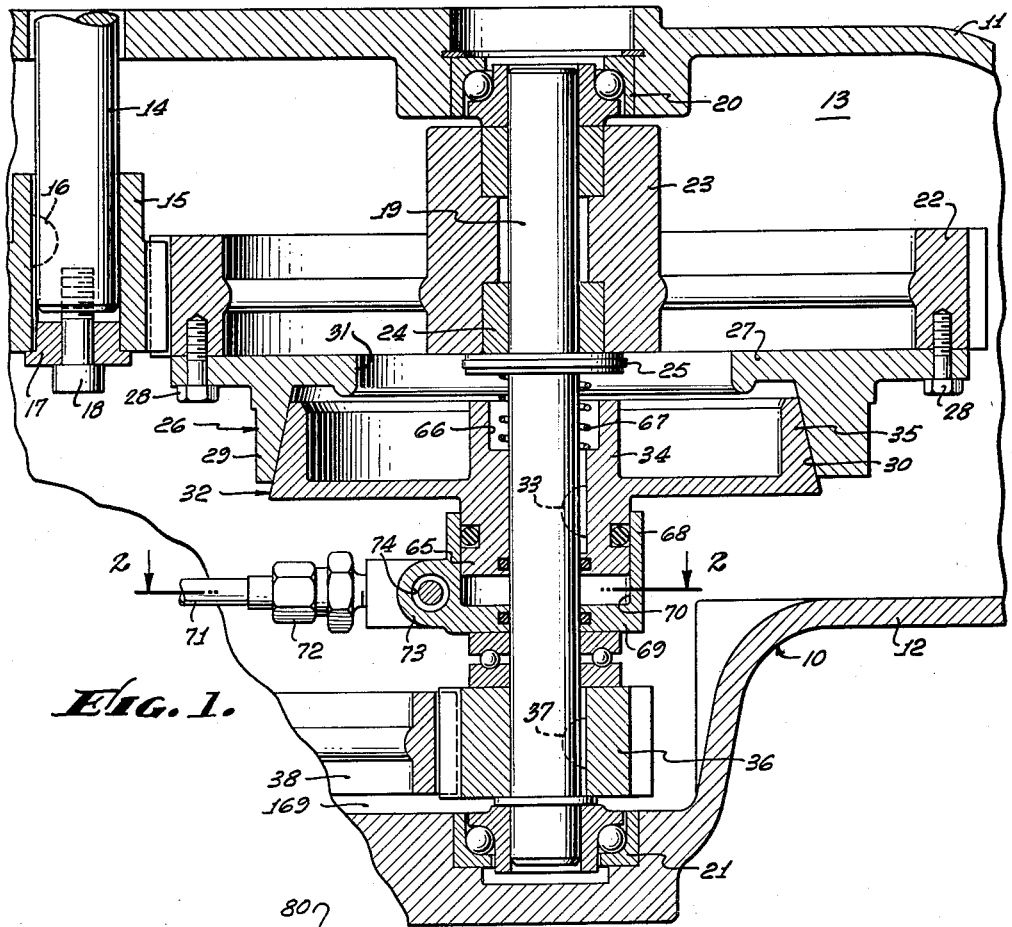
FIGURE 1 is a fragmentary longitudinal sectional view of a clutch set up for hydraulic operation.

In an embodiment of the invention chosen for the purpose of illustration there is shown a clutch housing 10 having an upper section 11 and a lower section 12. The sections are joined together to form a chamber 13. The chamber is a sealed chamber and adapted to contain a sufficient quantity of lubricant for assuring proper lubrication of the clutch parts at all times.

A drive shaft 14 extends from a prime mover (not shown) and has its outer end rotatably mounted within the chamber 13. A pinion 15 is non-rotatably secured to the drive shaft by means of a key 16 and is additionally held in place by a cap 17 and screw 18.

A clutch shaft 19 is rotatably mounted at respective upper and lower ends in the upper and lower sections 11 and 12 by means of bearings 20 and 21. The clutch shaft is accordingly free to rotate on the bearings.

A gear 22 is mounted by means of a hub 23 and bearings 24 on the clutch shaft 19 about which it is free to rotate. A disc 25 may be employed to hold the gear in proper meshing position with the pinion 15.

A clutch member indicated generally by the reference character 26 comprises a disc 27 bolted to a lower face of the gear 22 by bolts 28. On the plate is an enlargement or boss 29 in which is formed an inwardly contracting frusto-conical cavity 30. An aperture 31 opens the bottom of the cavity and provides access thereto for flow of lubricant.

Complementary to and cooperable with the clutch member 26 is a second clutch member 32. The second clutch member is slidable upon the clutch shaft 19 but non-rotatably secured thereto by means of a key 33 between the clutch shaft and a hub 34. The second clutch member has a frusto-conical projection 35 thereon complementary with respect to the frusto-conical cavity 30.

A pinion 36 is non-rotatably secured to the clutch shaft 19 by means of a key 37 and the pinion meshes with a gear 38 whereby rotation of the drive shaft 14 is carried through the clutch shaft 19 to the gear 38 which may be made to drive any appropriate mechanism. As shown in FIGURE 3 the gear 38 is provided with shaft 40 of a substantially conventional nature.

The pinion 36 may be adapted to bear against the bearing 21 to hold it in position.

For moving the lower clutch member 32 out of engagement with the upper clutch member 26, the hub 34 has a pocket 66 therein opening upwardly and accommodating a spring 67. The spring 67 is confined between the disc 25 and the bottom of the pocket and tends normally to separate the clutch member 32 from the clutch member 26.

A cylinder casing 68 with a bottom 69 thereof serves to enclose a cylinder bore 70 within which the piston 65 is adapted to reciprocate surrounding as it does the clutch shaft 19. To supply hydraulic liquid to the bore there is provided a hydraulic liquid supply line 71 attached by means of a fitting 72 to the cylindrical casing 68. An extension 73 of the cylindrical casing has a valve chamber 74 formed therein which in the chosen embodiment lies in a position transverse to the axis of the cylindrical casing and spaced a short distance on one side thereof. A supply port 75 communicates between the valve chamber and the supply line. An inlet port 76 communicates between the valve chamber and the bore 70. From the bore 70 an outlet port 77 communicates again with the cylindrical chamber and an exhaust port 78 is adapted to pass exhausted hydraulic liquid to the exterior from which point it can fall into the reservoir or sump 169 at the bottom of the lower section 12, there to serve as a lubricant for the rotating members.

Figure 2:
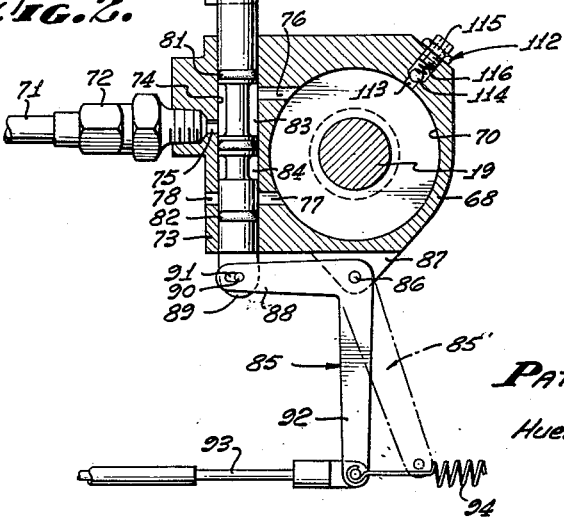
FIGURE 2 is a cross-sectional view taken on the line 2—2 of FIGURE 1.

A spool valve element 80 is mounted for reciprocatory movement in the valve chamber 74 and mounts seals 81 and 82. In the position illustrated in FIGURE 2 a supply recess 83 serves to interconnect the supply port 75 with the inlet port 76. At this point the outlet port 77 is sealed. In a second position of the spool valve an exhaust recess 84 will serve to interconnect the outlet port 77 with the exhaust port 78.

In order to shift the spool valve element from one position to another there is provided a bell crank pivotally connected by means of a pin 86 to a bracket 87 on the cylinder casing. An arm 88 of the bell crank is connected to an extension 89 of the spool valve by means of a pin 90 mounted on the extension entering a slot 91 on the arm. A second arm 92 is connected to a control cable 93 capable of manual manipulation at some suitable location. A spring 94 may be employed attached to the arm 92 at one end and to an appropriate location on the housing whereby normally to maintain the bell crank 85 in the dotted position 85'. In this position the supply of hydraulic liquid to the chamber 70 will be shut off and the chamber will be opened to exhaust.

In the normal position just described the spring 67 will tend to separate the clutch member 32 from the clutch member 26. In this position of adjustment there will be no transfer of power from the drive shaft 14 to the shaft 40. Hence blades 95 will not be subject to rotation. To cause the blades to rotate the cable 93 is pulled upon causing the spool valve to shift to the solid line position shown in FIGURE 2. In this position hydraulic liquid under pressure will pass from the supply line to the bore 70 of the hydraulic cylindrical casing and the force thus applied will operate against the bottom of the piston 65 causing the clutch member 32 to be pushed upwardly against tension of the spring 67 and cause the clutch faces to engage. As has been previously indicated the motion need be only a small fraction of an inch to cause effective engagement. Upon release of the hydraulic pressure the spring 67 separates the clutch members.

An important consideration in the form of the invention just described lies in the employment of a single pump 99 to supply hydraulic pressure at two different levels for two separate purposes utilizing at the same time hydraulic liquid which serves simultaneously as a lubricant for the moving parts.

The pump 99 is actuated by a rocker arm 100, a roller 101 of which rolls on a cam face 102 on the exterior of the clutch member 27. As the clutch member 26 rotates in continuous operation as long as the drive shaft 14 is rotated, the rocker arm 100 reciprocates causing reciprocation of a piston 103 to generate high pressure in the pump. A pump intake line 104 draws hydraulic liquid from the reservoir 169.

A high pressure line 105 conducts the high pressure hydraulic liquid to a control valve 106 of a substantially conventional type which by manipulation of a cable 107 is caused to operate. The control valve 106 passes high pressure hydraulic liquid through a supply line 108 to the interior of the shaft 40 wherein a suitable hydraulic ram mechanism causes tilting of the blades 95. A return line 109 passes return hydraulic liquid to the control valve 106 from whence it is ejected into the reservoir 169 for ultimate reuse and for lubricating the rotating and reciprocating parts.

Further details with respect to the double purpose hydraulic system and related valves and hydraulic motor are shown and described in co-pending application Serial No. 518,088, filed June 27, 1955, Patent No. 2,875,676.

The supply line 71 draws high pressure hydraulic liquid from a T connection 110 in the high pressure supply line 105. The amount of pressure in the high pressure supply line is controlled by a high pressure regulator valve 111 on the casing of the pump 99.

Since only a very low pressure is needed to manipulate the piston 65, the bore 70 is provided with a low pressure regulator valve 112. By this means hydraulic liquid in the bore 70 passes through a regulator port 113 past a ball valve element 114 outwardly of the bore and this liquid again falls into the reservoir 169. An adjusting nut 115 may be employed to change tension on the spring 116 to vary the pressure at which the low pressure regulating valve will release. This can be set at a very low pressure as, for example, fifty pounds per square inch, so that the clutch will be actuated at that low pressure even though the pressure in the high pressure line generated by the pump may be many hundred pounds per square inch. By this combination a high pressure pump supplying a high pressure line is at the same time made to supply pressure reduced in amount so as to properly actuate a low pressure cylinder without the necessity of any special regulatory valve means in the hydraulic liquid intake line.

As illustrated by the representation of FIGURE 9 the same hydraulic clutch actuator there shown in open position of the clutch may be employed to manipulate a more or less conventional disc clutch mechanism. As shown an upper clutch member 120 is attached by means of screws 121 to the gear 22. A lower clutch member 122 is non-rotatably keyed to the shaft 19 as heretofore described while at the same time being free to move axially with respect to the shaft. A clutch facing 123 on the upper clutch member is adapted to engage a clutch facing 124 on the lower clutch member when the clutch members are moved into engagement, thereby to establish a driving relationship between the clutch members. The lower clutch member 122 is provided with a piston 125 acting and serving as a piston of the hydraulic clutch cylinder 68 in the same manner as was described in connection with FIGURES 1 and 2.

If desired the faces of the clutch members may be of special approved metal to provide a metal to metal contact or on occasions one only of the faces may have a friction surface applied thereto.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A clutch mechanism comprising a housing, an open hydraulic reservoir in said housing, a clutch comprising a shaft, a first clutch element mounted on the shaft in driven communication with a source of power and a second clutch element slidably mounted on the shaft adapted to be driven by said first identified element when in engagement therewith, said second clutch element being mounted for axial movement into and out of contact with the first clutch element, and an actuator for said second clutch element comprising a hydraulic cylinder casing having a bore therein, a piston reciprocatably mounted in said bore and surrounding said shaft and comprising part of said second clutch element, said casing having a valve chamber at one side thereof including passage means communicating between said chamber and said bore, a supply port to said chamber and an exhaust port from said chamber, said exhaust port being located above the reservoir whereby to enable hydraulic liquid from said exhaust port to reach said reservoir, a valve element mounted in the chamber having one position enabling communication between the supply port and the bore whereby to effect movement of said one clutch element to engaging position, and another position enabling communication between said bore and said exhaust port, and a pressure relief valve device in said casing at a location above said reservoir and subject to operation when said supply port is in communication with said bore, said pressure relief valve being a pressure setting several times lower than the pressure in said supply port whereby to establish a pressure effective upon said piston several times less than the pressure in said supply port and to enable passage of hydraulic liquid from said bore to said reservoir.

2. A clutch mechanism comprising a housing, an open hydraulic reservoir in said housing, a clutch mounted in the housing above the reservoir comprising a shaft, a first clutch element mounted on the shaft in driven communication with a source of power and a second clutch element slidably mounted on the shaft adapted to be driven by said first clutch element when in engagement therewith, said second clutch element being mounted for movement axially into and out of contact with the first clutch, and an actuator for said clutch comprising a hydraulic cylinder casing non-rotatably mounted in the housing, said cylinder having a bore therein and surrounding said shaft, a piston reciprocatably mounted in said bore and surrounding said shaft and comprising part of said second clutch element, said casing having a cylindrical valve chamber at one side thereof including inlet and discharge ports communicating with said bore, a supply port to said chamber and an exhaust port from said chamber, a cylindrical valve element reciprocatably mounted in the chamber, said valve element having an annular inflow recess and an annular exhaust recess spaced from said inflow recess, said exhaust recess being located above and adapted to pass fluid by gravity to said reservoir, said valve element having one position enabling communication between the supply port and the inlet port whereby to effect movement of said second clutch element to engaging position and another position enabling communication between said discharge port and said exhaust port, and a pressure relief valve device in the casing in constant communication between said bore and the exterior at a location above said reservoir whereby to enable hydraulic fluid from said pressure relief valve to fall into said reservoir, said pressure relief valve having a setting operative at a pressure several times less than pressure in said supply port whereby to establish a pressure effective against said piston several times less than the pressure at said supply port.

3. A clutch mechanism comprising a housing, a clutch comprising a shaft, a clutch element mounted on the shaft in driven communication with a source of power and another element mounted on the shaft adapted to be driven by said first identified element when in engagement therewith, one said element being mounted for axial movement into and out of contact with the other, and an actuator for said one of said elements comprising hydraulic members having a mutually movable relationship, one of said members comprising a hydraulic cylinder having a bore therein and the other of said members comprising a piston in said bore, and an open reservoir in said housing for hydraulic fluid, one of said hydraulic members comprising part of one of said clutch elements, means forming a valve chamber on one of said hydraulic members including passage means communicating between said chamber and said bore, a supply port to said chamber and an exhaust port from said chamber in free flow communication with said reservoir, a valve element mounted in the chamber having one position enabling communication between the supply port and the bore whereby to effect movement of said one clutch element to engaging position and another position enabling communication between said bore and said exhaust port, said bore and said passage means comprising a hydraulic feed and return loop and a pressure relief valve in constant communication between said loop and the reservoir at all positions of said valve element operative at a pressure several times less than pressure in said supply port.

4. In a machine, the combination of a rotatably mounted and tiltable device; a power source for effecting rotation of said device; a hydraulic clutch for initiating and discontinuing rotation of said device; a hydraulic ram operatively connected to said device for tilting said device; and a hydraulic system for operating the clutch between clutch-engaged and clutch-disengaged positions and for operating the ram to tilt said device; the clutch comprising a driving clutch element operatively connected to said power source for rotating the element, a driven clutch element mounted for rotation and for movement on its axis of rotation into and out of engagement with the driving clutch element, means operatively associated with the driven clutch element for urging the driven clutch element out of engagement with the driving clutch element, hydraulic cylinder-piston means operatively connected to the driven clutch element for urging the driven clutch element into engagement with the driving clutch element, the driven clutch element being operatively connected to said device for rotating said device when the clutch elements are interengaged; the hydraulic conduit system comprising a hydraulic pump having a fluid inlet and a fluid outlet, a reservoir for containing a supply of hydraulic fluid, a conduit for fluid supply to the pump leading from the reservoir to the pump inlet, said cylinder-piston means having a fluid supply passage and a fluid exhaust passage formed therein, a conduit for fluid supply to said cylinder-piston means leading from the pump outlet to said fluid supply passage, a clutch-control valve operatively associated with said cylinder-piston supply conduit and with said fluid exhaust passage for reciprocation between clutch-engaged and clutch-disengaged positions in which the supply passage is open and the exhaust passage is closed in the clutch-engaged position, and the supply passage is closed and the exhaust passage is open in the clutch-disengaged position, a high pressure fluid supply conduit leading from the pump outlet to the hydraulic ram for operating the ram to tilt said device, a ram-control valve in the ram-supply conduit for controlling flow of fluid to the ram, said cylinder-piston means having a relief passage formed therein for outlet of fluid from the cylinder piston means, and a pressure relief valve in the relief passage for relief of fluid pressure when the pressure in the cylinder-piston means has reached a predetermined limit less than the pressure in the pump outlet.

5. A machine according to claim 4 in which said ram control valve includes a by-pass exhaust passage for dumping fluid into said reservoir, and said exhaust passage of the cylinder piston means and said relief passage for the relief valve are arranged for dumping fluid into the reservoir.

6. In a machine the combination of a rotatably mounted device; a power source for effecting rotation of said device; a hydraulic clutch for initiating and discontinuing rotation of said device; and a hydraulic system for operating the clutch between clutch-engaged and clutch-disengaged positions; the clutch comprising a driving clutch element operatively connected to said power source for rotating the element, a driven clutch element mounted for rotation and for movement on its axis of rotation into and out of engagement with the driving clutch element, means operatively associated with the driven clutch element for urging the driven clutch element out of engagement with the driving clutch element, hydraulic cylinder-piston means operatively connected to the driven clutch element for urging the driven clutch element into engagement with the driving clutch element, the driven clutch element being operatively connected to said device for rotating said device when the clutch elements are interengaged; the hydraulic conduit system comprising a hydraulic pump having a fluid inlet and a fluid outlet, a reservoir for containing a supply of hydraulic fluid, a conduit for fluid supply to the pump leading from the reservoir to the pump inlet, said cylinder-piston means having a fluid supply passage and a fluid exhaust passage formed therein, a conduit for fluid supply to said cylinder-piston means leading from the pump outlet to the said fluid supply passage, a clutch control valve operatively associated with said cylinder-piston supply conduit and with said fluid exhaust passage for reciprocation between clutch-engaged and clutch-disengaged positions in which the supply passage is open and the exhaust passage is closed in the clutch-engaged position, and the supply passage is closed and the exhaust passage is open in the clutch-disengaged position, said cylinder-piston means having a relief passage formed therein for outlet of fluid from the cylinder-piston means, and a pressure relief valve in the relief passage for the release of fluid pressure when the pressure in the cylinder-piston means has reached a predetermined limit less than the pressure in the pump outlet.

7. A machine according to claim 6 in which said exhaust passage of the cylinder-piston means and said relief passage for the relief valve are arranged for dumping fluid into the reservoir.

References Cited in the file of this patent

UNITED STATES PATENTS

| | | |
|---|---|---|
| 725,243 | Goodspeed | Apr. 14, 1903 |
| 1,131,401 | MacPherson | Mar. 9, 1915 |
| 1,611,545 | Maybach | Dec. 21, 1926 |
| 2,022,026 | Bragg | Nov. 26, 1935 |
| 2,352,140 | Trott | June 20, 1944 |
| 2,605,683 | Boulton | Aug. 5, 1952 |
| 2,689,507 | McCrery | Sept. 21, 1954 |
| 2,755,901 | Fippard | July 24, 1956 |
| 2,755,903 | McAninch | July 24, 1956 |
| 2,766,864 | Schilling | Oct. 16, 1956 |
| 2,875,676 | Thieme et al. | Mar. 3, 1959 |

FOREIGN PATENTS

| | | |
|---|---|---|
| 614,093 | Germany | June 1, 1935 |
| 863,720 | France | Jan. 6, 1941 |